(12) United States Patent
Dhaens et al.

(10) Patent No.: US 10,493,990 B2
(45) Date of Patent: Dec. 3, 2019

(54) SYSTEMS AND METHODS FOR RIDE CONTROL BLENDING IN ELECTRIC VEHICLES

(71) Applicants: Tenneco Automotive Operating Company Inc., Lake Forest, IL (US); Technische Universitaet Ilmenau, Ilmenau (DE)

(72) Inventors: Miguel Dhaens, Lommel (BE); Dzmitry Savitski, Ilmenau (DE); Valentin Ivanov, Ilmenau (DE); Klaus Augsburg, Arnstadt (DE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 11 days.

(21) Appl. No.: 15/843,395

(22) Filed: Dec. 15, 2017

(65) Prior Publication Data
US 2019/0185006 A1    Jun. 20, 2019

(51) Int. Cl.
*B60W 30/18*    (2012.01)
*B60W 10/08*    (2006.01)
*B60W 10/22*    (2006.01)

(52) U.S. Cl.
CPC ...... *B60W 30/18181* (2013.01); *B60W 10/08* (2013.01); *B60W 10/22* (2013.01); *B60W 2520/105* (2013.01); *B60W 2520/125* (2013.01); *B60W 2520/26* (2013.01); *B60W 2540/10* (2013.01); *B60W 2540/12* (2013.01); *B60W 2540/18* (2013.01); *B60W 2720/30* (2013.01)

(58) Field of Classification Search
CPC .......... B60W 30/18181; B60W 10/22; B60W 10/08; B60W 2520/125; B60W 2540/18; B60W 2540/12; B60W 2540/10; B60W 2720/30; B60W 2520/105; B60W 2520/26
See application file for complete search history.

(56) References Cited

U.S. PATENT DOCUMENTS 7,306,065 B2    12/2007  Nagaya
9,694,639 B2 *   7/2017  Near ................... H02K 5/12
(Continued)

FOREIGN PATENT DOCUMENTS

WO    2009-112846 A1    9/2009

OTHER PUBLICATIONS

Akaho et al.; Development of vehicle dynames control system for in-wheel-motor vehicle; JSAE annual congress (spring) 2010.
(Continued)

*Primary Examiner* — Tyler J Lee
(74) *Attorney, Agent, or Firm* — Harness, Dickey & Pierce, P.L.C.

(57) ABSTRACT

A system for performing ride control blending in an electric vehicle may include a control distribution module, a torque control module, and a vertical force control module. The control distribution module may calculate a torque control demand and a vertical force control demand associated with a wheel of the vehicle based on a generalized vertical force, a pitch moment, and a roll moment associated with a body of the vehicle. The torque control module may adjust torque applied by an electric motor to the wheel based on the torque control demand. The vertical force control module may adjust vertical force applied by a suspension actuator to the wheel based on the vertical force control demand.

18 Claims, 4 Drawing Sheets

(56) References Cited

U.S. PATENT DOCUMENTS

| | | | |
|---|---|---|---|
| 9,702,349 B2* | 7/2017 | Anderson | B60G 17/019 |
| 10,040,330 B2* | 8/2018 | Anderson | B60G 17/019 |
| 2005/0119817 A1 | 6/2005 | Pelchen et al. | |
| 2005/0236894 A1* | 10/2005 | Lu | B60T 8/1755 |
| | | | 303/139 |
| 2010/0250056 A1 | 9/2010 | Perkins | |
| 2011/0307129 A1 | 12/2011 | Yu et al. | |
| 2013/0030601 A1 | 1/2013 | Yoon | |
| 2014/0058606 A1 | 2/2014 | Hilton | |
| 2014/0284122 A1 | 9/2014 | Hirata | |
| 2014/0297117 A1* | 10/2014 | Near | H02K 5/12 |
| | | | 701/37 |
| 2015/0224845 A1* | 8/2015 | Anderson | B60G 17/019 |
| | | | 701/37 |
| 2016/0159225 A1* | 6/2016 | Nakatsu | B60L 7/26 |
| | | | 701/71 |
| 2017/0182859 A1* | 6/2017 | Anderson | B60G 17/019 |
| 2018/0134106 A9* | 5/2018 | Anderson | B60G 17/019 |
| 2019/0001782 A1* | 1/2019 | Anderson | B60G 17/019 |

OTHER PUBLICATIONS

Katsuyama et al.; Improvement of Ride Comfort by Unsprung Negative Skyhook Damper Control Using In-Wheel Motors; SAE International; Apr. 5, 2016.

Written Opinion issued in related PCT application No. PCT/US2018/065785 dated Mar. 29, 2019.

International Search Report in related PCT Application No. PCT/US2018/065785 dated Mar. 29, 2019.

* cited by examiner

SYSTEMS AND METHODS FOR RIDE CONTROL BLENDING IN ELECTRIC VEHICLES

FIELD

The present disclosure relates generally to vehicle control systems and more particularly to systems and methods for ride control blending in electric vehicles.

BACKGROUND

This section provides background information related to the present disclosure which is not necessarily prior art.

Goals associated with controlling vehicle ride dynamics include achieving desired (i) vertical forces on the vehicle's wheels and (ii) vertical acceleration of the vehicle's body. The desired vertical forces and vertical acceleration may be established based on criteria such as ride quality, which may be characterized by parameters including driving comfort and handling. Traditionally, control of vehicle ride dynamics has been accomplished by controllable suspension elements disposed between the vehicle body and the vehicle wheels. Frequently, the controllable suspension elements are controllable suspension dampers. Controllable suspension dampers may include semi-active dampers, or fully-active suspension actuators, depending on the type of the vehicle suspension. Controllable suspension dampers may take a variety of forms including, but not limited to, valved hydraulics, linear motors, ball screws, and other suitable actuators known to those having ordinary skill.

Electric vehicles may include individual wheel drive, whereby each wheel of the electric vehicle is driven by an in-wheel electric motor. However, mounting of the in-wheel motor may influence the vertical dynamics of the vehicle and, consequently, ride comfort of the vehicle. For example, in-wheel electric motors may create an adverse impact on ride comfort because they may increase the unsprung mass of the vehicle.

Accordingly, a need exists for systems and methods that integrate control of in-wheel electric motors and suspension actuators so as to provide enhanced ride dynamics control.

SUMMARY

This section provides a general summary of the disclosure, and is not a comprehensive disclosure of its full scope or all of its features.

According to a feature, a system for performing ride control blending in an electric vehicle is provided. The system may include a control distribution module, a torque control module, and a vertical force control module. The control distribution module may calculate a torque control demand and a vertical force control demand associated with a wheel of the vehicle based on a generalized vertical force, a pitch moment, and a roll moment associated with a body of the vehicle. The torque control module may adjust torque applied by an electric motor to the wheel based on the torque control demand. The vertical force control module may adjust vertical force applied by a suspension actuator to the wheel based on the vertical force control demand.

According to another feature, the system may include a comparison module. The comparison module may calculate the generalized vertical force, pitch moment, and roll moment associated with the body of the vehicle. The generalized vertical force, pitch moment, and roll moment may be calculated based on (i) respective differences between actual vertical parameter values associated with the body of the vehicle and reference vertical parameter values associated with the body of the vehicle; (ii) respective differences between actual pitch parameter values associated with the body of the vehicle and reference pitch parameter values associated with the body of the vehicle; and/or (iii) respective differences between actual roll parameter values associated with the body of the vehicle and reference roll parameter values associated with the body of the vehicle.

According to one feature, the system may include a reference vehicle module that calculates the reference vertical parameter values, the reference pitch parameter values, and the reference roll parameter values. The reference vertical parameter values, the reference pitch parameter values, and the reference roll parameter values may be calculated based on an accelerator pedal displacement from a baseline accelerator pedal position, a brake pedal displacement from a baseline brake pedal position, and a steering wheel angle.

According to another feature, the system may include an actual vehicle module that calculates the actual vertical parameter values, the actual pitch parameter values, and the actual roll parameter values. The actual vertical parameter values, the actual pitch parameter values, and the actual roll parameter values may be calculated based on one or more of: a measured longitudinal acceleration associated with the body of the vehicle, a measured lateral acceleration associated with the body of the vehicle, a measured vertical acceleration associated with the body of the vehicle, a measured yaw rate associated with the body of the vehicle, a measured pitch rate associated with the body of the vehicle, and/or a measured roll rate associated with the body of the vehicle.

According to a feature, a method for performing ride control blending in an electric vehicle is also provided. The method may include calculating a torque control demand and a vertical force control demand associated with a wheel of the vehicle based on a generalized vertical force, a pitch moment, and a roll moment associated with a body of the vehicle. Torque applied by an electric motor to the wheel may be adjusted based on the torque control demand. Vertical force applied by a suspension actuator to the wheel may be adjusted based on the vertical force control demand.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
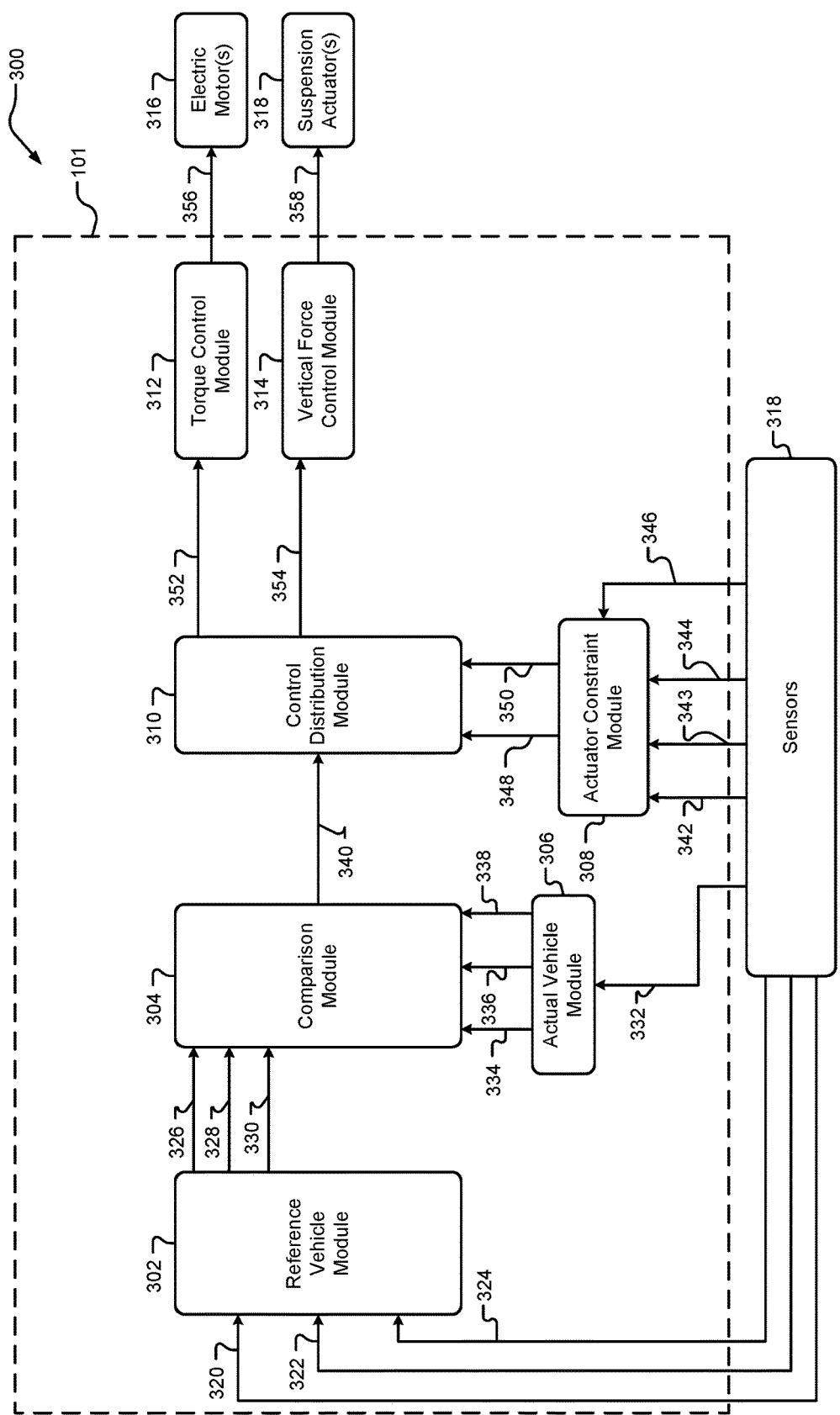
Figure 4:
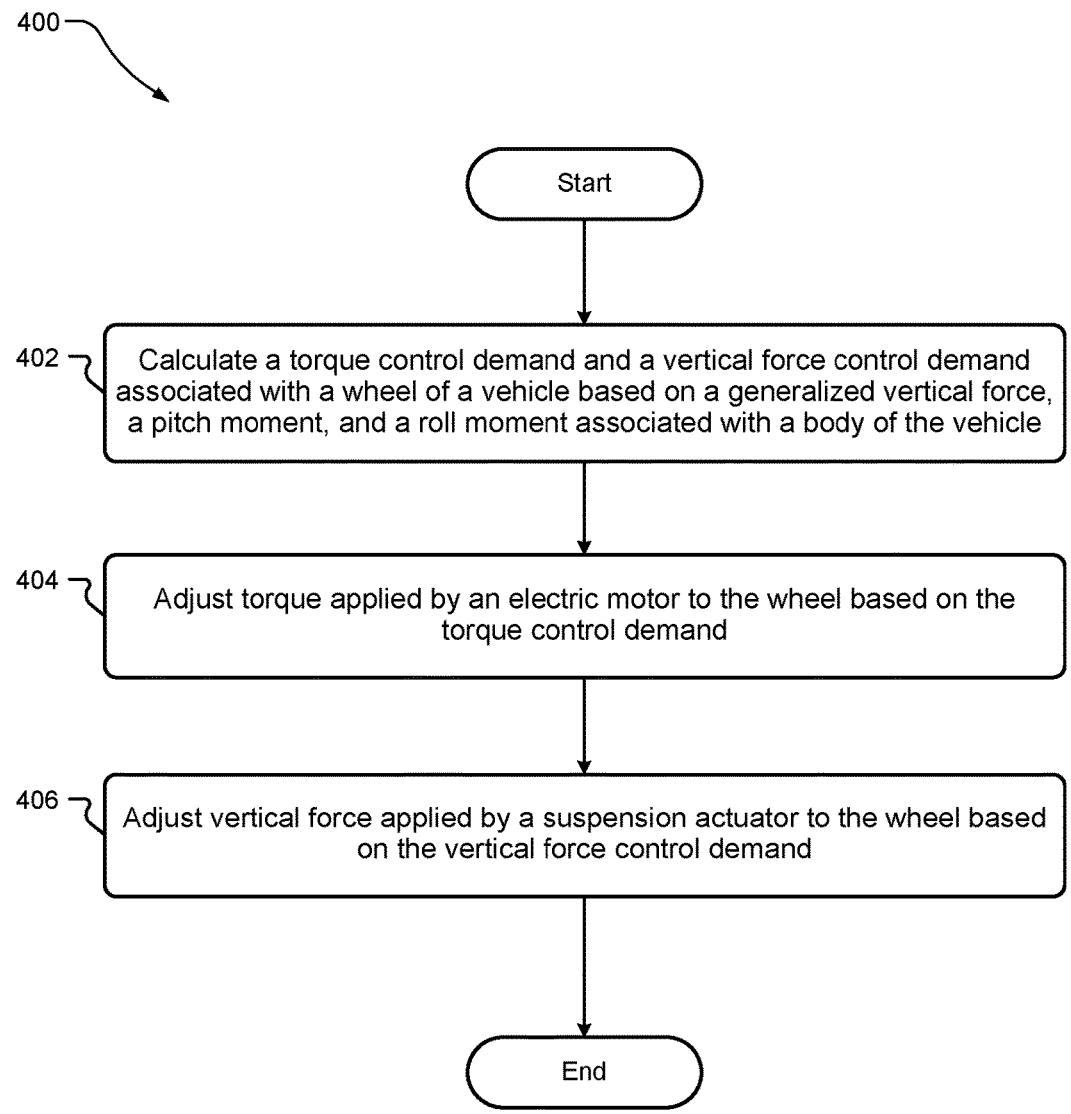

FIG. 3 is a functional block diagram illustrating a detailed view of a blended ride dynamics control module included as part of a blended ride dynamics control system in accordance with one example of the teachings of the present disclosure; and FIG. 4 is a flow chart illustrating a method for performing ride control blending in an electric vehicle in accordance with one example of the teachings of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
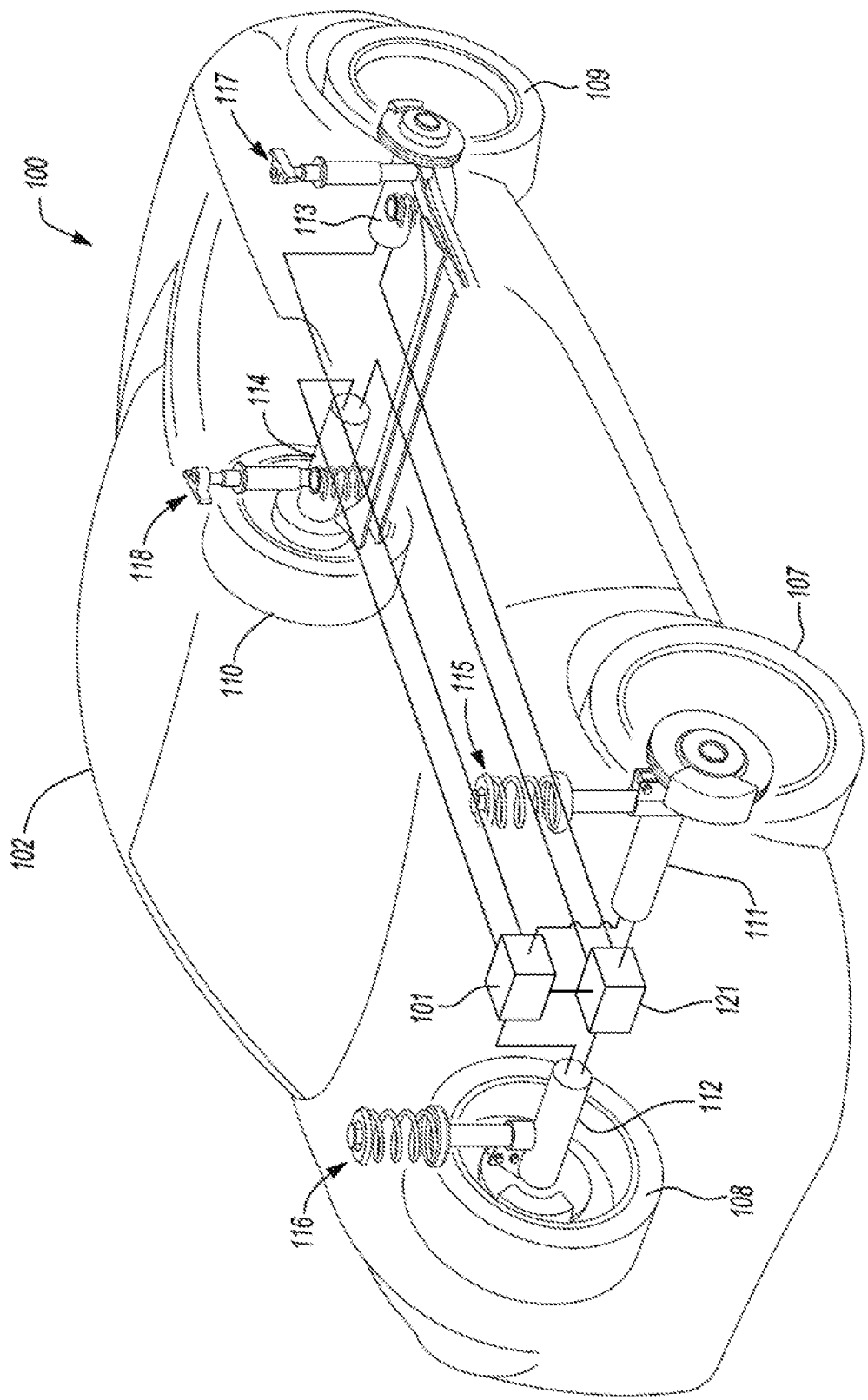
FIG. 1 is a diagrammatic illustration of a vehicle incorporating a blended ride dynamics control system in accordance with one example of the teachings of the present disclosure.

The following description is merely exemplary in nature and is not intended to limit the present disclosure, application or uses. FIG. 1 shows a vehicle 100 incorporating a blended ride dynamics control system. The vehicle 100 includes a body 102, a blended ride dynamics control module 101 configured to set and/or adjust torque and/or vertical force associated with each wheel of the vehicle 100, and a battery 121 configured to either (i) supply electric power to one or more electric motors associated with one or more corresponding wheels or (ii) receive electric power from one or more electric motors associated with one or more corresponding wheels. The determination of whether the battery 121 may supply or receive electric power may be based, for example, on a driving mode associated with the vehicle 100. By way of example and not limitation, the battery 121 may supply electric power while the vehicle 100 is in a traction driving mode and receive electric power while the vehicle 100 is in a breaking driving mode. While the vehicle 100 has been depicted as a passenger car, the blended ride dynamics control system described herein may be suitably incorporated as part of other types of vehicles and/or in other types of applications, such as vehicles incorporating independent front and/or independent rear suspension systems.

In addition, the vehicle 100 includes a first front wheel 107. The first front wheel 107 includes a first front electric motor 111, and a first front suspension actuator 115. The blended ride dynamics control module 101 is connected to the first front electric motor 111, the first front suspension actuator 115, and the battery 121. The blended ride dynamics control module 101 is configured to set and/or adjust torque applied by the first front electric motor 111 to the first front wheel 107. Similarly, the blended ride dynamics control module 101 is configured to set and/or adjust vertical force applied by the first front suspension actuator 115 to the first front wheel 107.

Further, the vehicle 100 includes a second front wheel 108. The second front wheel 108 includes a second front electric motor 112, and a second front suspension actuator 116. The blended ride dynamics control module 101 is connected to the second front electric motor 112, the second front suspension actuator 116, and the battery 121. The blended ride dynamics control module 101 is configured to set and/or adjust torque applied by the second front electric motor 112 to the second front wheel 108. Similarly, the blended ride dynamics control module 101 is configured to set and/or adjust vertical force applied by the second front suspension actuator 116 to the second front wheel 108.

The vehicle 100 also includes a first rear wheel 109. The first rear wheel 109 includes a first rear electric motor 113, and a first rear suspension actuator 117. The blended ride dynamics control module 101 is connected to the first rear electric motor 113, the first rear suspension actuator 117, and the battery 121. The blended ride dynamics control module 101 is configured to set and/or adjust torque applied by the first rear electric motor 113 to the first rear wheel 109. Similarly, the blended ride dynamics control module 101 is configured to set and/or adjust vertical force applied by the first rear suspension actuator 117 to the first rear wheel 109.

Further still, the vehicle 100 includes a second rear wheel 110. The second rear wheel 110 includes a second rear electric motor 114, and a second rear suspension actuator 118. The blended ride dynamics control module 101 is connected to the second rear electric motor 114, the second rear suspension actuator 118, and the battery 121. The blended ride dynamics control module 101 is configured to set and/or adjust torque applied by the second rear electric motor 114 to the second rear wheel 110. Similarly, the blended ride dynamics control module 101 is configured to set and/or adjust vertical force applied by the second rear suspension actuator 118 to the second rear wheel 110.

According to some examples, control of the electric motor torque and vertical force may occur dynamically (e.g., substantially in real-time) during operation of the vehicle 100. Moreover, according to certain examples, electric motor torque and vertical force may be customized on a per-wheel basis, or applied equally across all wheels 107-110 of the vehicle 100.

Figure 2:
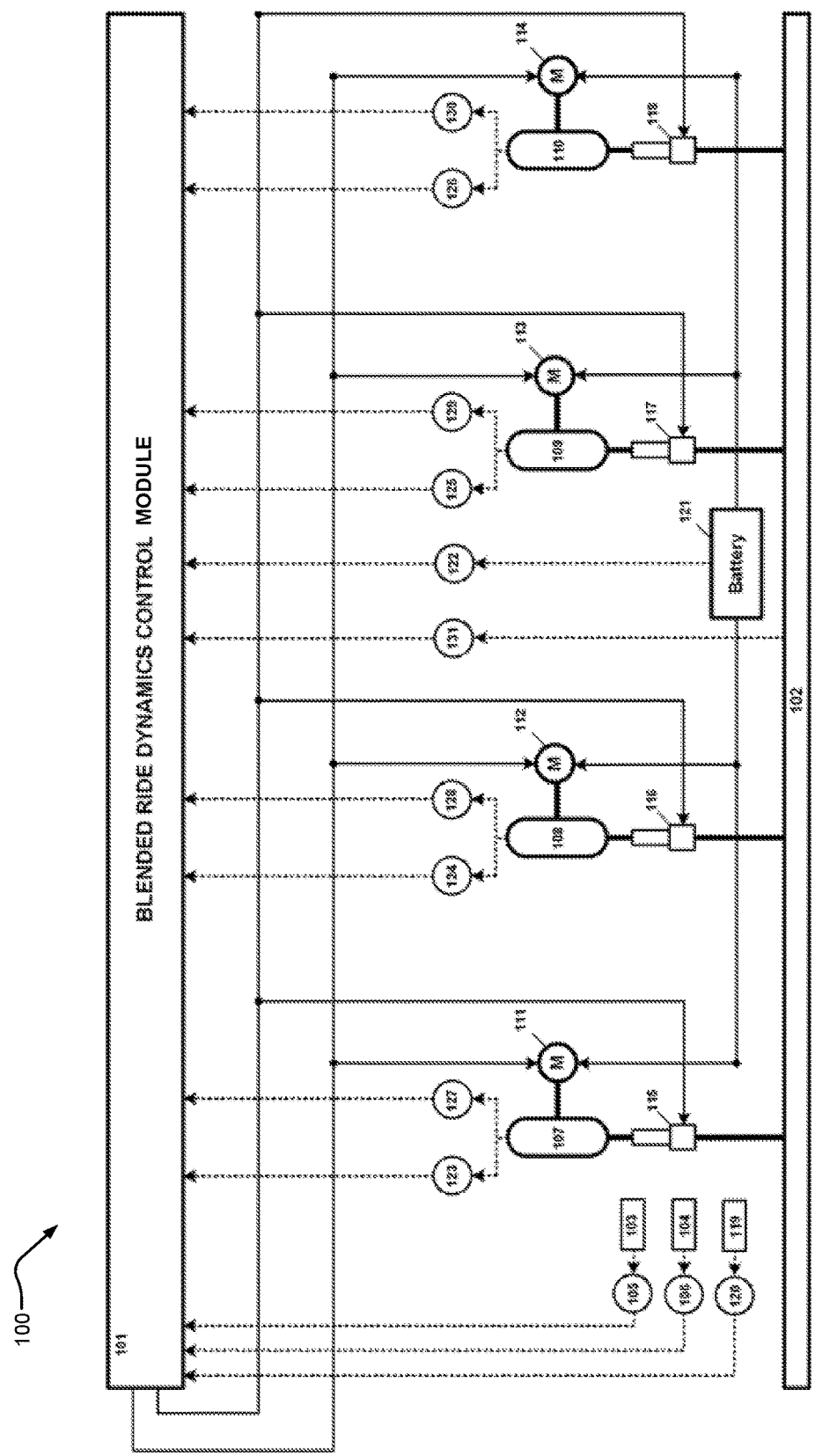
FIG. 2 is a functional block diagram illustrating the vehicle including a blended ride dynamics control system in accordance with one example of the teachings of the present disclosure.

Referring now to FIG. 2, a schematic of the vehicle 100 including a blended ride dynamics control system is shown. The vehicle 100 may constitute an electric vehicle with individual electric motors 111-114 for driving wheels 107-110. The electric motors 111-114 may be electrically connected to the battery 121, which may be mounted on the vehicle 100. As noted above, depending on the driving mode that the vehicle 100 is operating in (e.g., traction or braking driving modes), electric power may be either received by the electric motors 111-114 from the battery 121, or supplied from the electric motors 111-114 to the battery 121.

The vehicle 100 includes a blended ride dynamics control module 101 configured to set and/or adjust, for example, the electric motor torque and/or vertical force associated with each wheel of the vehicle 100. Although the vehicle 100 is shown including four wheels 107, 108, 109, and 110, according to some implementations, the vehicle 100 may include less or more wheels without deviating from the teachings of the present disclosure. Similarly, although the vehicle 100 is shown including four electric motors 111, 112, 113, and 114, according to some implementations, the vehicle 100 may include less or more electric motors without deviating from the teachings of the present disclosure.

The vehicle 100 also includes a body 102, which is coupled to the wheels 107-110 via respective suspension actuators 115, 116, 117, and 118. The suspension actuators 115-118 may be configured to adjust the vertical forces applied on the wheels 107-110. The magnitudes of the vertical forces applied by the suspension actuators 115-118 on the wheels 107-110 may be defined by the blended ride dynamics control module 101 and transferred to the suspension actuators 115-118 via suitable, respective control signals (e.g., one or more respective control currents and/or control voltages). According to some examples, the suspension actuators 115-118 may constitute elements of a semi-active, or active, suspension implemented within the vehicle 100. For example, the suspension actuators 115-118 may include, but are not limited to, controllable dampers as a valved hydraulic, linear motor, ball screw, valveless, or other suitable actuators known in the art.

Further, the vehicle 100 may include a plurality of sensors 105-106, 120, 122-131 configured to measure various parameters representative of operating conditions of the vehicle 100.

For example, battery sensor 122 may be configured to detect a state of the battery 121, including, but not limited to, a state of charge ("SOC"). Other battery parameters that may be detected by the sensor 122 include the current charging or discharging from the battery 121, temperature of the battery 121, voltage information, and any other types of battery parameters known in the art. In addition, sensor 122 may be configured to generate one or more signals indicative of one or more of the foregoing battery parameters, and transmit such signal(s) to the blended ride dynamics control module 101 for further processing. According to one example, the sensor may generate and transmit a signal indicative of an amount of charge remaining in the battery 121.

Sensor 105 may be configured to measure the position of an acceleration pedal 103, i.e., an accelerator pedal displacement from a baseline acceleration pedal position. In addition, sensor 105 may be configured to generate a signal indicative of the acceleration pedal displacement and transmit such signal to the blended ride dynamics control module 101 for further processing. Similarly, sensor 106 may be configured to measure the position of a brake pedal 104, i.e., a brake pedal displacement from a baseline brake pedal position. In addition, sensor 106 may be configured to generate a signal indicative of the brake pedal displacement and transmit such signal to the blended ride dynamics control module 101 for further processing.

Sensor 120 may be configured to measure the position of the steering wheel 119, i.e., a steering wheel angle. In addition, sensor 120 may be configured to generate a signal indicative of the steering wheel angle and transmit such signal to the blended ride dynamics control module 101 for further processing.

Sensors 123, 124, 125, and 126 are mounted to the wheels 107-110. Each sensor of the plurality of sensors 123-126 may be configured to measure the rotational speed of the wheel to which it is mounted (e.g., sensor 123 may measure the speed of wheel 107). In addition, the sensors 123-126 may be configured to generate respective signals indicative of the wheels' rotational speeds and transmit such signals to the blended ride dynamics control module 101 for further processing.

Sensors 127, 128, 129, and 130 are mounted to the suspension actuators 115-118 (e.g., dampers) of the wheels 107-110. Each sensor of the plurality of sensors 127-130 may be configured to measure a position or displacement of its corresponding suspension actuator. For example, sensor 127 may measure the position or displacement of suspension actuator 115. In addition, the sensors 127-130 may be configured to generate respective signals indicative of the position or displacement of suspension actuators 115-118 and transmit such signals to the blended ride dynamics control module 101 for further processing.

Sensor 131 may be mounted to the body 102 of the vehicle 100. The sensor 131 may be configured to measure the following parameters associated with the body 102 of the vehicle 100: longitudinal acceleration, latitudinal acceleration, vertical acceleration, yaw rate, pitch rate, and/or roll rate. According to some examples, the sensor 131 may constitute a six-degree-of-freedom inertial measurement unit (IMU). In addition, the sensor 131 may be configured to generate one or more signals indicative of the longitudinal acceleration, latitudinal acceleration, vertical acceleration, yaw rate, pitch rate, and/or roll rate and transmit such signals to the blended ride dynamics control module 101 for further processing.

Turning now to FIG. 3, a vehicle 300 including a blended ride dynamics control module 101 is shown. More specifically, FIG. 3 illustrates a detailed view of the blended ride dynamics control module 101 shown in FIG. 2. The vehicle 300 may be identical, or substantially similar, in structure to the vehicle 100 discussed above with regard to FIGS. 1-2. The blended ride dynamics control module 101 may be connected to various sensors 318 (such as, for example, the sensors discussed above with regard to FIG. 2), as well as one or more electric motors 316 and one or more suspension actuators 318 for controlling, respectively, electric torque and/or vertical force associated with one or more wheels of the vehicle 300.

In the example shown in FIG. 3, the blended ride dynamics control module 101 includes a reference vehicle module 302, a comparison module 304, an actual vehicle module 306, an actuator constraint module 308, a control distribution module 310, a torque control module 312, and a vertical force control module 314. In operation, the blended ride dynamics control module 101 may function as follows.

The reference vehicle module 302 obtains (i.e., fetches or receives) various sensor readings 320, 322, and 324 from the sensors 318 of the vehicle 300. More specifically, the reference vehicle module 302 obtains: (i) a sensor reading 320 indicating a steering wheel angle (δ); (ii) a sensor reading 322 indicating a brake pedal displacement ($s_b$) from a baseline brake pedal position; and (iii) a sensor reading 324 indicating an acceleration pedal displacement ($s_a$) from a baseline acceleration pedal position. According to one example, sensor readings 320, 322, and 324 may be obtained from sensors such a sensors 105, 106, and 120 discussed above with regard to FIG. 2.

Based on the sensor readings 320, 322, and 324, the reference vehicle module 302 is configured to calculate reference vertical parameter values $(z_b, \dot{z}_b, \ddot{z}_b)^{ref}$ 326, reference pitch parameter values $(\theta, \dot{\theta}, \ddot{\theta})^{ref}$ 328, and reference roll parameter values $(\phi, \dot{\phi}, \ddot{\phi})$ 330. The reference vertical parameter values $(z_b, \dot{z}_b, \ddot{z}_b)^{ref}$ 326 may include a reference vertical displacement, reference vertical rate, and reference vertical acceleration associated with the body of the vehicle 300. The reference pitch parameter values $(\theta, \dot{\theta}, \ddot{\theta})^{ref}$ 328 may include a reference pitch angle, reference pitch rate, and reference pitch acceleration associated with the body of the vehicle 300. The reference roll parameter values $(\phi, \dot{\phi}, \ddot{\phi})^{ref}$ 330 may include a reference roll angle, reference roll rate, and reference roll acceleration associated with the body of the vehicle 300. The reference parameter values 326, 328, and 330 may be associated with particular maneuver conditions associated with the vehicle 300. Moreover, according to some examples, depending on the ride control targets (e.g., driving comfort, road holding, handling, etc.), a full set of parameters, or less than a full set of parameters (e.g., only particular selected parameters) may be utilized as a control reference. According to one example (e.g., an idealized case), the values of the reference parameters 326, 328, and 330 may be set to zero.

The actual vehicle module 306 obtains sensor reading(s) 332 from one or more sensors of the sensors 318. According to one example, the actual vehicle module 306 obtains sensor reading(s) 332 from a sensor (e.g., an IMU), such as sensor 131 discussed above in the context of FIG. 2. The sensor reading(s) 332 may include one or more of the following measured parameters associated with the body of the vehicle 300: longitudinal acceleration, latitudinal acceleration, vertical acceleration, yaw rate, pitch rate, and/or roll rate. Based on the sensor reading(s) 332, the actual vehicle module 306 is configured to calculate the following actual parameter values associated with the body of the vehicle 300: actual vertical parameter values 334, actual pitch parameter values 336, and actual roll parameter values 338. The actual vertical parameter values $(z_b, \dot{z}_b, \ddot{z}_b)^{act}$ 334 may include an actual vertical displacement, actual vertical rate, and actual vertical acceleration associated with the body of the vehicle 300. The actual pitch parameter values $(\theta, \dot{\theta}, \ddot{\theta})^{act}$ 336 may include an actual pitch angle, actual pitch rate, and actual pitch acceleration associated with the body of the vehicle 300. The actual roll parameter values $(\phi, \dot{\phi}, \ddot{\phi})^{act}$ 338 may include an actual roll angle, actual roll rate, and actual roll acceleration associated with the body of the vehicle 300. As used herein, "actual" refers to the value or magnitude of a particular parameter at a present, or substantially present, point in time (e.g., a "real-time," or substantially real-time, value of a particular parameter). According to certain examples, the actual vehicle module 306 is configured to calculate the actual parameter values 334, 336, 338 using a lookup table or the like based on the sensor reading(s) 332 based on correlations known in the art.

The comparison module 304 obtains outputs 326, 328, and 330 from the reference vehicle module 302 and outputs 334, 336, and 338 from the actual vehicle module 306. The comparison module 304 is configured to calculate a generalized vertical force, pitch moment, and roll moment associated with the body of the vehicle 300 based on outputs 326, 328, 330, 334, 336, and 338. More specifically, the comparison module 304 is configured to calculate a virtual control input v* 340 representing the generalized vertical force, pitch moment, and roll moment according to the following equation $$v^* = [F_z M_\theta M_\phi]$$ (Equation 1)

where $F_z$ is the generalized vertical force, $M_\theta$ is the pitch moment, and $M_\phi$ is the roll moment of the body of the vehicle 300. The virtual control input v* 340 may be calculated by the comparison module 304 based on the following: (i) respective differences (e.g., errors) between actual vertical parameter values 334 associated with the body of the vehicle 300 and reference vertical parameter values 326 associated with the body of the vehicle 300; (ii) respective differences (e.g., errors) between actual pitch parameter values 336 associated with the body of the vehicle 300 and reference pitch parameter values 328 associated with the body of the vehicle 300; and (iii) respective differences (e.g., errors) between actual roll parameter values 338 associated with the body of the vehicle 300 and reference roll parameter values 330 associated with the body of the vehicle 300.

The control distribution module 310 obtains the virtual control input v* 340 from the comparison module 340. The control distribution module 310 is configured to calculate a torque control demand $u_d$ 352 and a vertical force control demand 354 $u_s$ associated with one or more wheels of the vehicle 300 based on the generalized vertical force, pitch moment, and roll moment associated with the body of the vehicle 300, i.e., based on the virtual control input v*340.

In addition, according to one example implementation, the control distribution module 310 also obtains one or more actuator constraints 348 and/or 350 from the actuator constraint module 308. In this example, the control distribution module 310 may calculate the torque control demand $u_d$ 352 and a vertical force control demand 354 $u_s$ based additionally on the actuator constraints 348 and/or 350.

The actuator constraints 348, 350 may define lower $u_{lim,j}^{low}$ and upper $u_{lim,j}^{up}$ actuator constraints associated, respectively, with the electric motor(s) 316 and suspension actuator(s) 318. More specifically, constraint set 348 may indicate upper and lower actuator constraints associated with the one or more electric motor(s) 316 and constraint set 350 may indicate upper and lower actuator constraints associated with the one or more suspension actuators 318. The actuator constraints 348, 350 may be calculated by the actuator constraint module 308 based on sensor readings 342, 343, 344, and/or 346. More specifically, actuator constraint 348 may be calculated based on sensor reading 342 indicating electric motor speed $\omega_{em,i}$, sensor reading 343 indicating electric motor torque $T_{em,i}$, and sensor reading 344 indicating the SOC of the battery of the vehicle 300. According to one example, sensor readings 324-344 may be obtained from sensors, such as sensors 123-126 described above with regard to FIG. 2. In addition, according to some examples, sensor readings 342-344 may be measured directly from the applicable sensors. According to other examples, one or more of the sensor readings 342-344 may be derived from directly measured readings using a lookup table or the like based on correlations known in the art. Actuator constraint 350 may be calculated based on sensor reading 346 indicating one or more positions $z_{w,i}$ of one or more suspension actuators 318. According to one example, the sensor reading 346 may be obtained from one or more sensors, such as sensors 127-130 described above with regard to FIG. 2.

The torque control module 312 obtains the torque control demand $u_d$ 352 from the control distribution module 310. Based on the torque control demand $u_d$ 352, the torque control module 312 is configured to generate a torque adjustment signal 356 configured to adjust the torque applied by the electric motor(s) 316 to each of the one or more wheels of the vehicle 300. According to one example, the torque adjustment signal 356 may constitute a control current $l_{em,l}$ and/or control voltage $U_{em,l}$ for each electric motor of the one or more electric motors 316 of the drivetrain system of the vehicle 300. The control current $l_{em,l}$ and/or control voltage $U_{em,l}$ may take on any suitable values according to techniques known in the art.

The vertical force control module 314 obtains the vertical force control demand 354 $u_s$ from the control distribution module 310. Based on the vertical force control demand 354 $u_s$, the vertical force control module 314 is configured to generate a vertical force adjustment signal 358 configured to adjust the vertical force applied by the suspension actuator(s) 318 to each of the one or more wheels of the vehicle 300. According to one example, the vertical force adjustment signal 358 may constitute a control current $l_{s,j}$ for each suspension actuator of the one or more suspension actuators 318 of the suspension system of the vehicle 300. The control current $l_{s,j}$ may take on any suitable values according to techniques known in the art.

In some examples, the torque and vertical force may be adjusted simultaneously. In other examples, the torque and vertical force may be adjusted at one or more different times.

Referring now to FIG. 4, a method 400 for performing ride control blending in an electric vehicle is provided. The method 400 begins at 402 where a torque control demand and a vertical force control demand associated with a wheel of the vehicle are calculated. The torque control demand and vertical force control demand may be calculated based on a generalized vertical force, a pitch moment, and a roll moment associated with a body of the vehicle. At 404, torque applied by an electric motor to the wheel may be adjusted based on the torque control demand. At 406, vertical force applied by a suspension actuator to the wheel may be adjusted based on the vertical force control demand. In some examples, the torque and vertical force may be adjusted simultaneously. In other examples, the torque and vertical force may be adjusted at one or more different times.

According to some examples (not shown in FIG. 4), the method may further include calculations of differences between certain actual parameter values and certain reference parameter values. According to this example, the method may include (i) calculating respective differences between actual vertical parameter values associated with the body of the vehicle and reference vertical parameter values associated with the body of the vehicle to provide a first set of calculated differences; (ii) calculating respective differences between actual pitch parameter values associated with the body of the vehicle and reference pitch parameter values associated with the body of the vehicle to provide a second set of calculated differences; and (iii) calculating respective differences between actual roll parameter values associated with the body of the vehicle and reference roll parameter values associated with the body of the vehicle to provide a third set of calculated differences. According to another example of the foregoing method, the generalized vertical force, the pitch moment, and the roll moment may be calculated based on the first, second, and third sets of calculated differences.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for performing ride control blending in an electric vehicle, comprising:
 a control distribution module that calculates a torque control demand and a vertical force control demand associated with a wheel of the vehicle based on a generalized vertical force, a pitch moment, and a roll moment associated with a body of the vehicle;
 a torque control module that adjusts torque applied by an electric motor to the wheel based on the torque control demand;
a vertical force control module that adjusts vertical force applied by a suspension actuator to the wheel based on the vertical force control demand; and
 a comparison module that calculates the generalized vertical force, pitch moment, and roll moment associated with the body of the vehicle based on:
  respective differences between actual vertical parameter values associated with the body of the vehicle and reference vertical parameter values associated with the body of the vehicle;
  respective differences between actual pitch parameter values associated with the body of the vehicle and reference pitch parameter values associated with the body of the vehicle; and
  respective differences between actual roll parameter values associated with the body of the vehicle and reference roll parameter values associated with the body of the vehicle.

2. The system of claim 1, wherein:
the actual vertical parameters comprise an actual vertical displacement, an actual vertical rate, and an actual vertical acceleration; and
the reference vertical parameters comprise a reference vertical displacement, a reference vertical rate, and a reference vertical acceleration.

3. The system of claim 1, wherein:
the actual pitch parameters comprise an actual pitch angle, an actual pitch rate, and an actual pitch acceleration; and
the reference pitch parameters comprise a reference pitch angle, a reference pitch rate, and a reference pitch acceleration.

4. The system of claim 1, wherein:
the actual roll parameters comprise an actual roll angle, an actual roll rate, and an actual roll acceleration; and
the reference roll parameters comprise a reference roll angle, a reference roll rate, and a reference roll acceleration.

5. The system of claim 1, further comprising:
a reference vehicle module that calculates the reference vertical parameter values, the reference pitch parameter values, and the reference roll parameter values based on:
 an accelerator pedal displacement from a baseline accelerator pedal position;
 a brake pedal displacement from a baseline brake pedal position; and
 a steering wheel angle.

6. The system of claim 1, further comprising:
an actual vehicle module that calculates the actual vertical parameter values, the actual pitch parameter values, and the actual roll parameter values based on at least some of:
 a measured longitudinal acceleration associated with the body of the vehicle;
 a measured lateral acceleration associated with the body of the vehicle;
 a measured vertical acceleration associated with the body of the vehicle;
 a measured yaw rate associated with the body of the vehicle;
 a measured pitch rate associated with the body of the vehicle; and
 a measured roll rate associated with the body of the vehicle.

7. A system for performing ride control blending in an electric vehicle, comprising:
 a control distribution module that calculates a torque control demand and a vertical force control demand associated with a wheel of the vehicle based on a generalized vertical force, a pitch moment, and a roll moment associated with a body of the vehicle;
 a torque control module that adjusts torque applied by an electric motor to the wheel based on the torque control demand;
a vertical force control module that adjusts vertical force applied by a suspension actuator to the wheel based on the vertical force control demand; and
 an actuator constraint module that calculates (i) respective upper and lower actuator constraints associated with the electric motor and (ii) respective upper and lower actuator constraints associated with the suspension actuator.

8. The system of claim 7, wherein the control distribution modules calculates the torque control demand and the vertical force control demand further based on (i) the respective upper and lower actuator constraints associated with the electric motor and (ii) the respective upper and lower actuator constraints associated with the suspension actuator.

9. The system of claim 1, wherein the torque control module adjusts the torque applied by the electric motor to the wheel by generating at least one of a control current and a control voltage.

10. The system of claim 1, wherein the vertical force control module adjusts the vertical force applied by the suspension actuator to the wheel by generating a control current.

11. The system of claim 1, further comprising:
the electric motor, wherein the electric motor is connected to the torque control module and applies torque to the wheel.

12. The system of claim 1, further comprising:
the suspension actuator, wherein the suspension actuator is connected to the vertical force control module and applies vertical force to the wheel.

13. A method for performing ride control blending in an electric vehicle, comprising:
 calculating a torque control demand and a vertical force control demand associated with a wheel of the vehicle based on a generalized vertical force, a pitch moment, and a roll moment associated with a body of the vehicle;
 adjusting torque applied by an electric motor to the wheel based on the torque control demand;
 adjusting vertical force applied by a suspension actuator to the wheel based on the vertical force control demand;
 calculating respective differences between actual vertical parameter values associated with the body of the vehicle and reference vertical parameter values associated with the body of the vehicle to provide a first set of calculated differences;

calculating respective differences between actual pitch parameter values associated with the body of the vehicle and reference pitch parameter values associated with the body of the vehicle to provide a second set of calculated differences; and calculating respective differences between actual roll parameter values associated with the body of the vehicle and reference roll parameter values associated with the body of the vehicle to provide a third set of calculated differences.

14. The method of claim 13, further comprising:
calculating the generalized vertical force, the pitch moment, and the roll moment based on the first, second, and third sets of calculated differences.

15. The method of claim 13, further comprising:
calculating the reference vertical parameters values, the reference pitch parameter values, and the reference roll parameter values based on:
an accelerator pedal displacement from a baseline accelerator pedal position;
a brake pedal displacement from a baseline brake pedal position; and
a steering wheel angle.

16. The method of claim 13, further comprising:
calculating the actual vertical parameters values, the actual pitch parameter values, and the actual roll parameter values based on at least some of:
a measured longitudinal acceleration associated with the body of the vehicle;
a measured lateral acceleration associated with the body of the vehicle;
a measured vertical acceleration associated with the body of the vehicle;
a measured yaw rate associated with the body of the vehicle;
a measured pitch rate associated with the body of the vehicle; and
a measured roll rate associated with the body of the vehicle.

17. A method for performing ride control blending in an electric vehicle, comprising:
calculating a torque control demand and a vertical force control demand associated with a wheel of the vehicle based on a generalized vertical force, a pitch moment, and a roll moment associated with a body of the vehicle;
adjusting torque applied by an electric motor to the wheel based on the torque control demand;
adjusting vertical force applied by a suspension actuator to the wheel based on the vertical force control demand; and
calculating (i) respective upper and lower actuator constraints associated with the electric motor and (ii) respective upper and lower actuator constraints associated with the suspension actuator.

18. The method of claim 17, wherein calculating the torque control demand and the vertical force control demand is further based on (i) the respective upper and lower actuator constraints associated with the electric motor and (ii) the respective upper and lower actuator constraints associated with the suspension actuator.

* * * * *